(12) United States Patent
Darukhanavala

(10) Patent No.: US 9,702,115 B1
(45) Date of Patent: Jul. 11, 2017

(54) AUTONOMOUS METHOD FOR DETECTING A PILE

(71) Applicant: Caterpillar Inc., Peoria, IL (US)

(72) Inventor: Carl P. Darukhanavala, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 14/990,857

(22) Filed: Jan. 8, 2016

(51) Int. Cl.
*E02F 3/84* (2006.01)
*E02F 3/76* (2006.01)
(Continued)

(52) U.S. Cl.
CPC ............ *E02F 9/205* (2013.01); *B60T 8/174* (2013.01); *E02F 3/841* (2013.01); *E02F 3/844* (2013.01); *E02F 9/2025* (2013.01); *E02F 9/2029* (2013.01); *E02F 9/26* (2013.01); *B60W 2050/0057* (2013.01); *E02F 3/431* (2013.01); *E02F 3/434* (2013.01); *E02F 3/76* (2013.01); *E02F 3/7609* (2013.01); *E02F 3/84* (2013.01); *E02F 9/264* (2013.01)

(58) Field of Classification Search
None
See application file for complete search history.

(56) References Cited

U.S. PATENT DOCUMENTS 5,832,187 A * 11/1998 Pedersen ............... G06Q 10/06
340/577
5,860,480 A * 1/1999 Jayaraman ............ E02F 3/845
172/2

(Continued)

FOREIGN PATENT DOCUMENTS

GB 2536008 A * 9/2016 ............ B60W 40/11

*Primary Examiner* — Fadey Jabr
*Assistant Examiner* — Kevin P Mahne
(74) *Attorney, Agent, or Firm* — Finnegan, Henderson, Farabow, Garrett & Dunner, LLP

(57) ABSTRACT

An autonomous method for detecting when an earthmoving machine has moved a pile of dirt into contact with another pile of dirt may include receiving at a controller a plurality of signals indicative of one or more parameters including a ground speed of the machine, a target ground speed of the machine, a load on a work implement of the machine, an output speed of a torque converter of the machine, a machine pitch, a machine steering command, a machine heading, and a heading of a slot the machine is in. The controller may standardize and normalize each signal from the plurality of signals in order to create values for each of the one or more parameters that all fall within a common range, wherein the common range is representative of a range from minimum to maximum values for each of the one or more parameters. The controller may also determine a variation of each of the values for the one or more parameters over each of a plurality of time periods to calculate relative rates of change for the one or more parameters, weight each of the values for each of the one or more parameters as a function of the relative rates of change, add up the weighted values of the parameters, and apply a sigmoid function to the weighted values of the parameters in order to limit the effect any one of the parameters has on an output indicative of behavior characteristic of the machine having pushed a pile of dirt into contact with another pile of dirt.

19 Claims, 7 Drawing Sheets

(51) Int. Cl.
   *E02F 9/20*   (2006.01)
   *E02F 9/26*   (2006.01)
   *B60T 8/174*  (2006.01)
   *E02F 3/43*       (2006.01)
   *B60W 50/00*      (2006.01)

(56) References Cited

U.S. PATENT DOCUMENTS

| | | | |
|---|---|---|---|
| 5,983,161 A * | 11/1999 | Lemelson | G01S 19/11 340/436 |
| 6,137,886 A * | 10/2000 | Shoureshi | F16F 15/002 381/71.2 |
| 6,371,214 B1 | 4/2002 | Anwar et al. | |
| 6,442,535 B1 * | 8/2002 | Yifan | H02P 25/092 310/165 |
| 8,036,797 B2 | 10/2011 | Johnson et al. | |
| 8,200,398 B2 | 6/2012 | Sahlin et al. | |
| 2001/0044789 A1 * | 11/2001 | Widrow | G06N 3/061 706/14 |
| 2001/0056319 A1 * | 12/2001 | Rocke | E02F 3/434 701/50 |
| 2002/0103623 A1 * | 8/2002 | Hasegawa | G07C 5/008 702/184 |
| 2004/0162644 A1 * | 8/2004 | Torii | B60G 17/0162 701/1 |
| 2006/0243180 A1 * | 11/2006 | Sundermeyer | A01B 63/00 112/470.06 |
| 2007/0219693 A1 * | 9/2007 | Stratton | E02F 9/2029 701/50 |
| 2009/0012686 A1 * | 1/2009 | Maeda | B60T 8/174 701/70 |
| 2009/0326768 A1 * | 12/2009 | Shull | E02F 3/431 701/50 |
| 2010/0100338 A1 * | 4/2010 | Vik | G01M 5/0033 702/42 |
| 2014/0114556 A1 * | 4/2014 | Pan | G08G 1/00 701/119 |
| 2014/0344200 A1 * | 11/2014 | Schie | G06N 3/0635 706/20 |
| 2015/0197248 A1 * | 7/2015 | Breed | G08G 1/09626 701/93 |
| 2015/0283703 A1 * | 10/2015 | Izhikevich | B25J 9/163 706/11 |
| 2016/0084813 A1 * | 3/2016 | Anderson | A01D 41/127 702/5 |

* cited by examiner

AUTONOMOUS METHOD FOR DETECTING A PILE

TECHNICAL FIELD

The present disclosure is directed to a method for autonomously controlling an earthmoving machine and, more particularly, autonomously detecting when the earthmoving machine pushes a pile of dirt into another pile of dirt.

BACKGROUND

Heavy equipment, such as bulldozers, load-haul-dump machines (LHDs), wheel loaders, carry dozers, etc., are used during an excavation process and when moving overburden material from an area of a job site in order to expose a material that is being mined. An earthmoving machine may scoop up material from a first location and push a pile of the material loaded into and in front of a work implement of the machine, such as a dozer blade, to a second location where the pile contacts another pile of dirt in front of it. Successive piles of dirt are placed behind each other in a method referred to as backstacking the piles. The backstacking of the piles of dirt may be performed in a pivot push operation when the material being moved is not pushed over a crest. In a pivot push operation the earthmoving machine cuts into surface material for a period of time to load the work implement with the material, and then stops cutting and moves the material to a side of the cast or slot that the machine is forming. The piles of material moved to the side may be backstacked, smoothed over, and then additional piles may be backstacked on top of the layer formed by backstacked piles. The intent of backstacked piles is to build layers of dirt by placing individual piles in a row, starting from a low wall, and moving forward to the pivot point. The piles are then smoothed over and compacted by the machine when it drives up on the piles to start a new layer. A productivity of the excavation process can be affected by an efficiency of each machine during every excavation cycle. In particular, the efficiency of each machine increases when the machine's work implement (e.g., a straight or curved dozer blade) is fully loaded with material within a short amount of time, and the resulting pile of dirt is placed adjacent to a previous pile of dirt at the correct shape and spacing to prevent sloughing of the material and to allow for efficient smoothing of the piles in each layer. The preferred pile spacing and machine characteristics change dynamically depending on the pitch of the machine and surrounding terrain when attempting the backstacking of the piles.

Some applications require operation of the heavy equipment under hazardous working conditions. In these applications, some or all of the machines can be remotely or autonomously controlled to complete the excavation process. When a machine is remotely or autonomously controlled, however, situational awareness may be limited. That is, it can be difficult for the remote operator or the automated system to accurately determine a degree of tool engagement with the pile during the loading segment of the excavation process. As a result, the machine's tool may be underloaded during a particular loading segment, or overloaded, where too much energy and time may be consumed by attempting to increase loading of the tool.

One attempt to improve efficiency in the loading segment of the excavation process is disclosed in U.S. Pat. No. 8,363,210 of Montgomery that issued on Jan. 29, 2013 ("the '210 patent"). Specifically, the '210 patent discloses a system for locating a topographic feature at a job-site. The system includes a laser range finder connected to the arm of an excavator, and a computer in communication with the laser range finder. The laser range finder directs a pattern of light onto the topographic feature, and the computer is configured to receive a reflection of the light, thereby locating a point on the feature. By directing the light onto multiple different points of the feature, the computer may, through the use of common equations, be able to determine a location, angle, slope, grade, and volume of the feature.

Although the system of the '210 patent may provide information that could possibly improve machine efficiencies, the system may still be less than optimal. In particular, the system may require the excavator to be stationary; the location of the excavator may need to be precisely known; movements of the excavator may need to be accurately tracked; and the light may need to be manually and perfectly aimed. In addition, in order to determine feature parameters other than a single point location, the system may have to separately detect the locations of multiple different points so that the corresponding calculations can be performed. These actions may take a significant amount of time, and also allow for the introduction of error.

The disclosed autonomous method for controlling an earthmoving machine is directed to overcoming one or more of the problems set forth above and/or other problems of the prior art.

SUMMARY

One aspect of the present disclosure is directed to an autonomous method for detecting when an earthmoving machine has moved a pile of dirt into contact with another pile of dirt. The method may include receiving at a controller a plurality of signals indicative of one or more parameters including a ground speed of the machine, a target ground speed of the machine, a load on a work implement of the machine, an output speed of a torque converter of the machine, a machine pitch, a machine steering command, a machine heading, and a heading of a slot the machine is in. The method may also include standardizing and normalizing each signal from the plurality of signals using the controller in order to create values for each of the one or more parameters that all fall within a common range, wherein the common range is representative of a range from minimum to maximum values for each of the one or more parameters. The method may still further include determining with the controller a variation of each of the values for the one or more parameters over each of a plurality of time periods to calculate relative rates of change for the one or more parameters, weighting each of the values for each of the one or more parameters as a function of the relative rates of change for the one or more parameters, adding up the weighted values of the parameters, and applying a sigmoid function to the weighted values of the parameters using the controller in order to limit the effect any one of the parameters has on an output indicative of behavior characteristic of the machine having pushed a pile of dirt into contact with another pile of dirt.

Another aspect of the present disclosure is directed to a system for autonomously controlling an earthmoving machine, wherein the earthmoving machine includes a frame, a plurality of driving members connected to the frame and configured to support the frame, a powertrain mounted to the frame and configured to drive the plurality of driving members, a work implement operatively connected to the frame and having an edge configured to engage a material to be moved by the machine, at least a first sensor configured to generate a first signal indicative of at least one of one or more operational parameters of the machine, and a controller in communication with the at least a first sensor, controls for the powertrain, and controls for the work implement. The controller may be configured to implement a method for operating the machine, wherein the method may include receiving a plurality of signals indicative of one or more parameters including a ground speed of the machine, a target ground speed of the machine, a load on the work implement of the machine, an output speed of a torque converter of the machine, a machine pitch, a machine steering command, a machine heading, and a heading of a slot the machine is in. The method implemented by the controller may also include standardizing and normalizing each signal from the plurality of signals in order to create values for each of the one or more parameters that all fall within a common range, wherein the common range is representative of a range from minimum to maximum values for each of the one or more parameters. The controller may also determine a variation of each of the values for the one or more parameters over each of a plurality of time periods to calculate relative rates of change for the one or more parameters, weight each of the values for each of the one or more parameters as a function of the relative rates of change for the one or more parameters, add up the weighted values of the parameters, and apply a sigmoid function to the weighted values of the parameters using the controller in order to limit the effect any one of the parameters has on an output indicative of behavior characteristic of the machine having pushed a pile of dirt into contact with another pile of dirt.

Another aspect of the present disclosure is directed to a non-transitory computer-readable media comprising computer-executable instructions that, when executed on one or more processors, perform a method for detecting when an earthmoving machine has moved a pile of dirt into contact with another pile of dirt. The method may include receiving a plurality of signals indicative of one or more parameters including a ground speed of the machine, a target ground speed of the machine, a load on a work implement of the machine, an output speed of a torque converter of the machine, a machine pitch, a machine steering command, a machine heading, and a heading of a slot the machine is in. The method may also include standardizing and normalizing each signal from the plurality of signals in order to create values for each of the one or more parameters that all fall within a common range, wherein the common range is representative of a range from minimum to maximum values for each of the one or more parameters, determining a variation of each of the values for the one or more parameters over each of a plurality of time periods, weighting each of the values for each of the one or more parameters as a function of how quickly each value is changing over each of the plurality of time periods, and adding up the weighted values of the parameters. The method may still further include applying a sigmoid function to the weighted values of the parameters in order to limit the effect any one of the values of the parameters has on an output indicative of a determination that the machine has pushed a pile of dirt into another pile of dirt.

DETAILED DESCRIPTION

Figure 1:
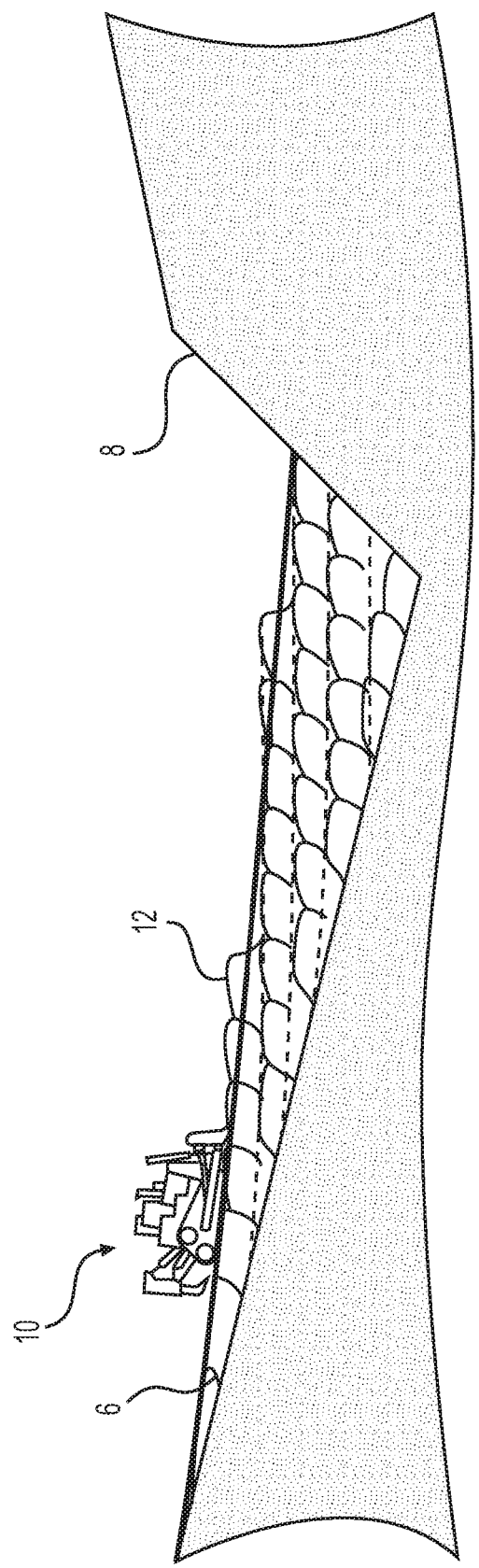
FIGS. 1-4 are side diagrammatic illustrations, respectively, of an exemplary disclosed earthmoving machine being controlled autonomously at a worksite in accordance with various control systems and methods of this disclosure.

FIGS. 1-4 illustrate an exemplary earthmoving machine 10 having multiple systems and components that cooperate to move piles of material 12. In the disclosed examples, the machine 10 is a track-type bulldozer. The earthmoving machine 10 could embody any other type of excavation and earthmoving machine (e.g., a wheel loader, a scraper, or a carry dozer), if desired.

The earthmoving machine 10 may include, among other things, an implement system and a powertrain. The implement system of the machine 10 may be driven by the powertrain to repetitively move a work implement during completion of an excavation and earthmoving cycle. The disclosed excavation and earthmoving cycle may be associated with removing overburden material from above an area that is being mined. The powertrain of the machine, in addition to driving the implement system, may also function to propel the machine 10, for example via one or more traction devices (e.g., wheels or tracks). As shown in the exemplary implementations of FIGS. 1-4, the machine 10 may be autonomously operated on various terrains, and utilized to backstack piles of dirt 12 back from a wall 8 along a slope 6. The machine 10 may initially scoop up a load of material in the blade or other work implement of the machine, and then push that material up against the wall 8 to form the first pile of material 12. The machine may then reverse and scoop up and push additional piles of material up against the earlier stacked piles.

Figure 2:
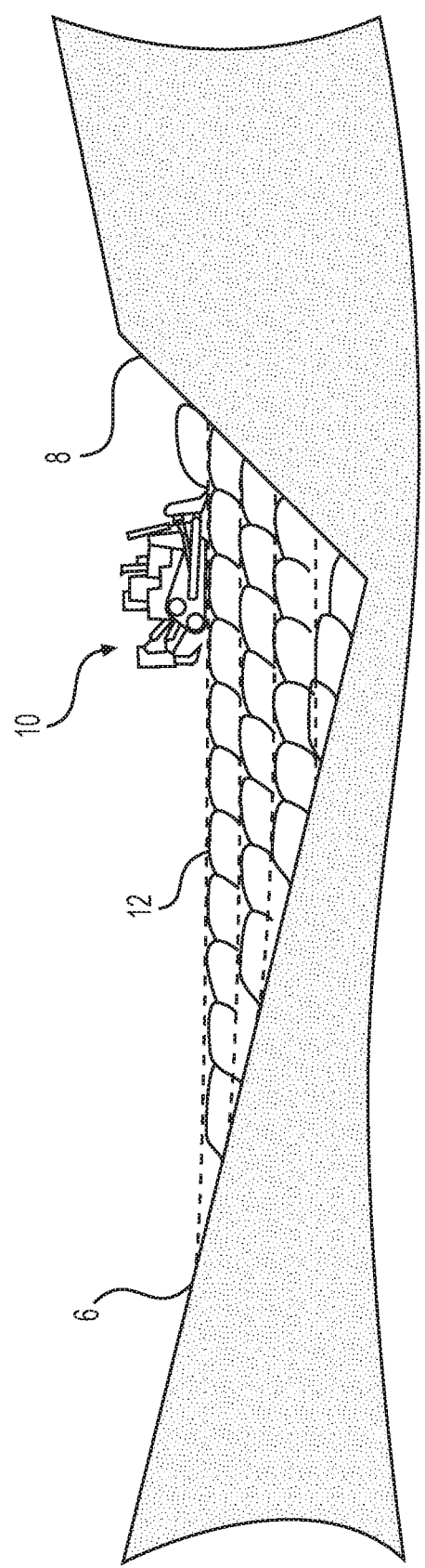
Figure 3:
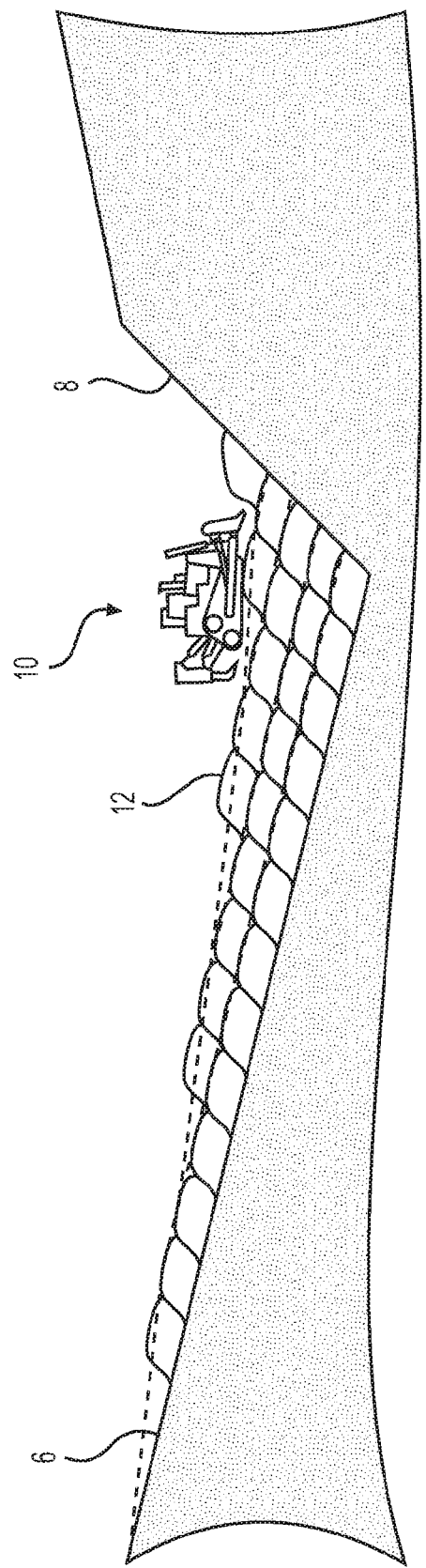
Figure 4:
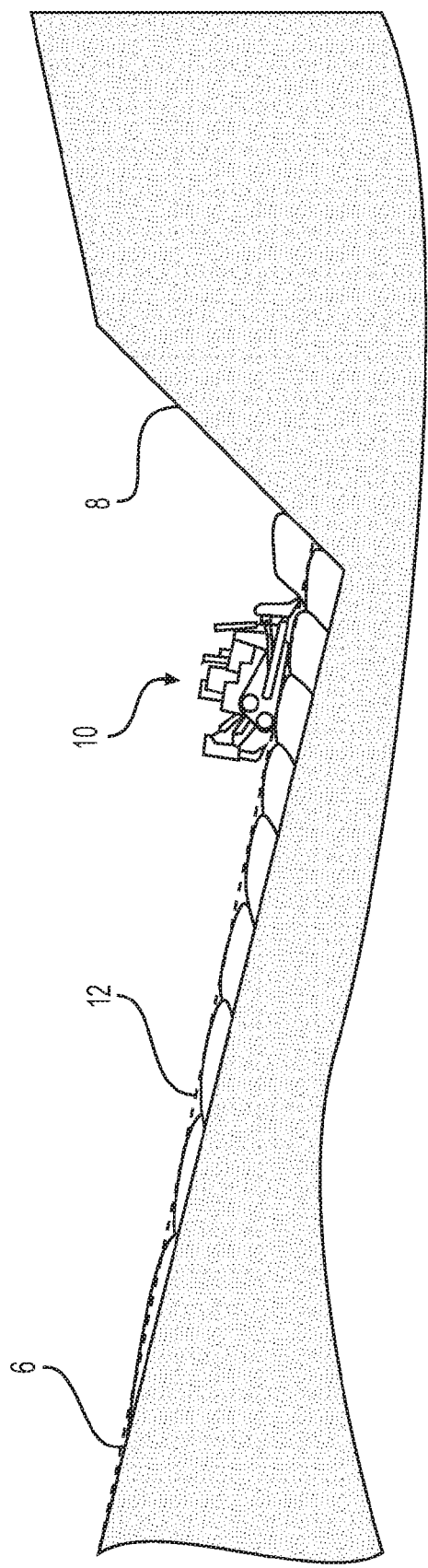
Figure 5:
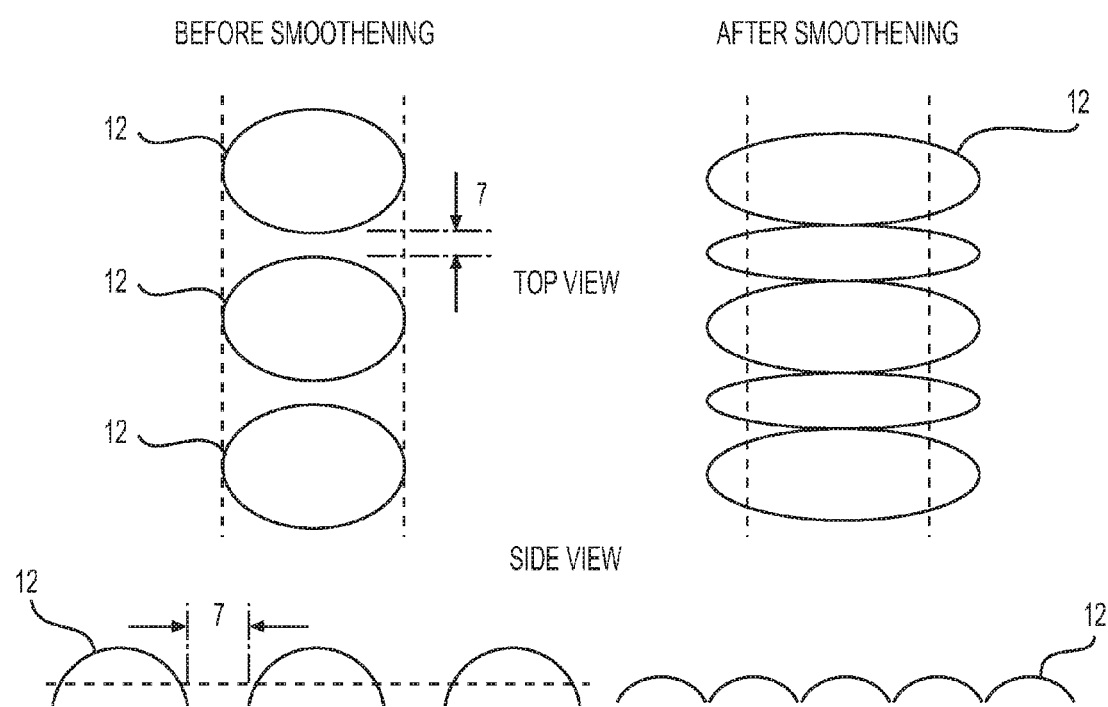
FIG. 5 is a top diagrammatic illustration of various stages in the process being performed in FIGS. 1-4.

In the implementation shown in FIG. 1, the piles 12 may be backstacked in a wedge configuration along the slope 6 and up against the wall 8. After each of the piles 12 is pushed into a pile in front, the machine 10 may then drive up on top of the piles 12 and perform a smoothing operation to achieve the desired configuration. In the implementation shown in FIG. 2, the backstacking and smoothing operations result in a flat, or level terrain across the tops of the backstacked piles 12. In the implementations shown in FIGS. 1-3, the backstacking and smoothing operations may result in the piles being backstacked into more layers over the deeper part of the grade, and fewer layers over the shallower part of the grade to form one of the illustrated wedge-shaped or flat final configurations. As illustrated in FIGS. 1-3, each of the backstacked piles may be of approximately the same size and shape. In the alternative implementation shown in FIG. 4, the backstacking and smoothing operations may be performed to form layers of piles 12, where the individual piles 12 may be more elongated and flattened as they are positioned farther back from the wall 8 in order to fill a wedge-shaped volume more efficiently. As shown in the top view of FIG. 5, the piles of material 12 may be formed with an initial spacing 7 between the piles before the piles are compressed together and smoothed over. As illustrated by the shapes of the piles on the left-hand side of FIG. 5, the piles 12 may initially fit within a distance shown between the dashed lines. As illustrated on the right-hand side of FIG. 5, the machine may then drive up on top of the piles to perform the smoothing operation, and in turn compress the piles in an outwardly manner so that they fall outside of the distance shown between the dashed lines, providing stability for the machine 10 to drive over.

In accordance with various implementations of this disclosure, a control system is provided for autonomously detecting when the work implement of the machine 10 contacts a pile of material 12, or when the machine 10 has pushed a pile of material 12 loaded into and in front of the work implement into another pile of material 12. The autonomous pile detection may be utilized for backstacking piles of dirt in a pivot push operation, where successive piles of dirt are placed one behind another. The pile detection may occur when the blade or other work implement of the machine 10 is loaded with dirt and pushes the pile it recently loaded into another pile in front of it. The interaction between the two piles of dirt will cause the pile detection algorithm to trigger and reverse the machine either instantaneously or after some configured time later. The backstacked piles of dirt allow for the building of layers of dirt by placing individual piles in a row, starting from a wall or other backdrop, and moving forward to a pivot point. The successively placed piles of dirt are then smoothed over and compacted by the tractor or other machine when it drives up on the piles to start a new layer of dirt.

The pile detection algorithm run by an autonomous control system in accordance with the present disclosure is configured to space the piles of dirt in the most efficient manner possible to prevent sloughing of material. Sloughing of material includes an undesired amount of material spilling off the side of the blade or work implement of the machine, or spilling out of the slot that is being formed by the machine. The autonomous control system may also be configured to run the pile detection algorithm in a manner that places the successive piles of dirt in the most efficient and effective spacing and shape to allow the piles to be smoothed over by the machine. The pile spacing, or distance between piles when they are backstacked, is a parameter that, in conjunction with the elevation difference between each layer of material being formed, defines how well the smoothing operation occurs and how stable the ground is when the dozer or other machine moves on to the next layer to backstack additional piles. If the pile spacing is too small, productivity and efficiency may be wasted trying to push one pile into another. If the pile spacing is too large, the machine may shed material too quickly into the gaps between the piles, and run out of material before it reaches the end of the next layer during its smoothing pass. If the pile spacing is too large, when the piles are compacted, the piles will not push outwards as much as they should since more of the material will be filling in the gaps between the piles. This may result in the machine experiencing some instability during the smoothing operation as the material fails to adequately support the machine. The autonomous control system in accordance with various implementations of this disclosure may also be configured to constantly calculate the distance from the last machine reversal point. This information together with the pitch of the machine can determine if pile detection did not trigger when it should have and the machine has climbed up on a pile in front of the machine. The control system may be configured to cause the machine to automatically reverse in these situations to avoid damaging the shaping of the piles that have already been backstacked.

In various known configurations of the machine 10, an implement system may include a linkage structure that cooperates with one or more hydraulic actuators to move a work implement, such as the dozer blade. The linkage structure may be pivotally connected at a first end to a frame of the machine, and pivotally connected at a second end to the work implement. The hydraulic actuators may include a single tilt cylinder and a pair of lift cylinders connected between the work implement, linkage structure, and/or frame of the machine 10 to rack (i.e., tilt) the work implement back in a carry mode when a load of material is primarily retained in the implement, and lift and pitch the implement forward in a spread mode when dirt is primarily allowed to fall from the implement and underneath the implement as the machine 10 moves forward in the smoothing operation. As is known in the art, a greater or lesser number of hydraulic actuators may be included within the implement system of the machine and/or connected in a manner other than described above, if desired.

The powertrain of the machine 10 may be supported by a frame of the machine, and may include an engine configured to produce a rotational power output and a transmission that converts the power output to a desired ratio of speed and torque. The rotational power output may be used to drive a pump that supplies pressurized fluid to the hydraulic actuators and/or to one or more motors associated with the traction devices that move the machine. The engine of the powertrain may be a combustion engine configured to burn a mixture of fuel and air, the amount and/or composition of which directly corresponds to the rotational power output. The transmission of the powertrain may take any form known in the art, for example a power shift configuration that provides multiple discrete operating ranges, a continuously variable configuration, or a hybrid configuration.

Numerous different work implements may be operatively attachable to a single machine 10 and driven by the powertrain. The work implements may include any device used to perform a particular task such as, for example, a straight or curved blade, a bucket, a fork arrangement, a shovel, or any other task-performing device known in the art. The work implement may be connected to lift, rack, and tilt relative to the machine 10, rotate, slide, swing open/close, or move in any other manner known in the art.

The machine 10 may also include one or more externally mounted sensors. Each sensor may be a device that detects and ranges objects, for example a LIDAR (light detection and ranging) device, a RADAR (radio detection and ranging) device, a SONAR (sound navigation and ranging) device, a camera device, or another device known in the art. In one example, a sensor may include an emitter that emits a horizontal 2-D detection beam within a zone located in front of the machine 10 (i.e., in front of the work implement), and an associated receiver that receives a reflection of that detection beam. Based on characteristics of the reflected beam, a distance and a direction from an actual sensing location of the sensor on the machine 10 to a portion of the sensed object (e.g., to a face of a pile of material 12) within the particular zone may be determined. The sensor may then generate a signal corresponding to the distance, direction, size, and/or shape of the pile of material 12 at the height of the sensor, and communicate the signal to an onboard or offboard controller for subsequent conditioning.

Alternatively or additionally, the machine 10 may be outfitted with a communication device that allows communication of the sensed information to an offboard entity. For example, the earthmoving machine 10 may communicate with a remote control operator and/or a central facility (not shown) via the communication device. This communication may include, among other things, the location of each pile of material 12, properties (e.g., shape) of the material piles, operational parameters of the machine 10, surrounding terrain configuration, and/or control instructions or feedback.

Figure 6:
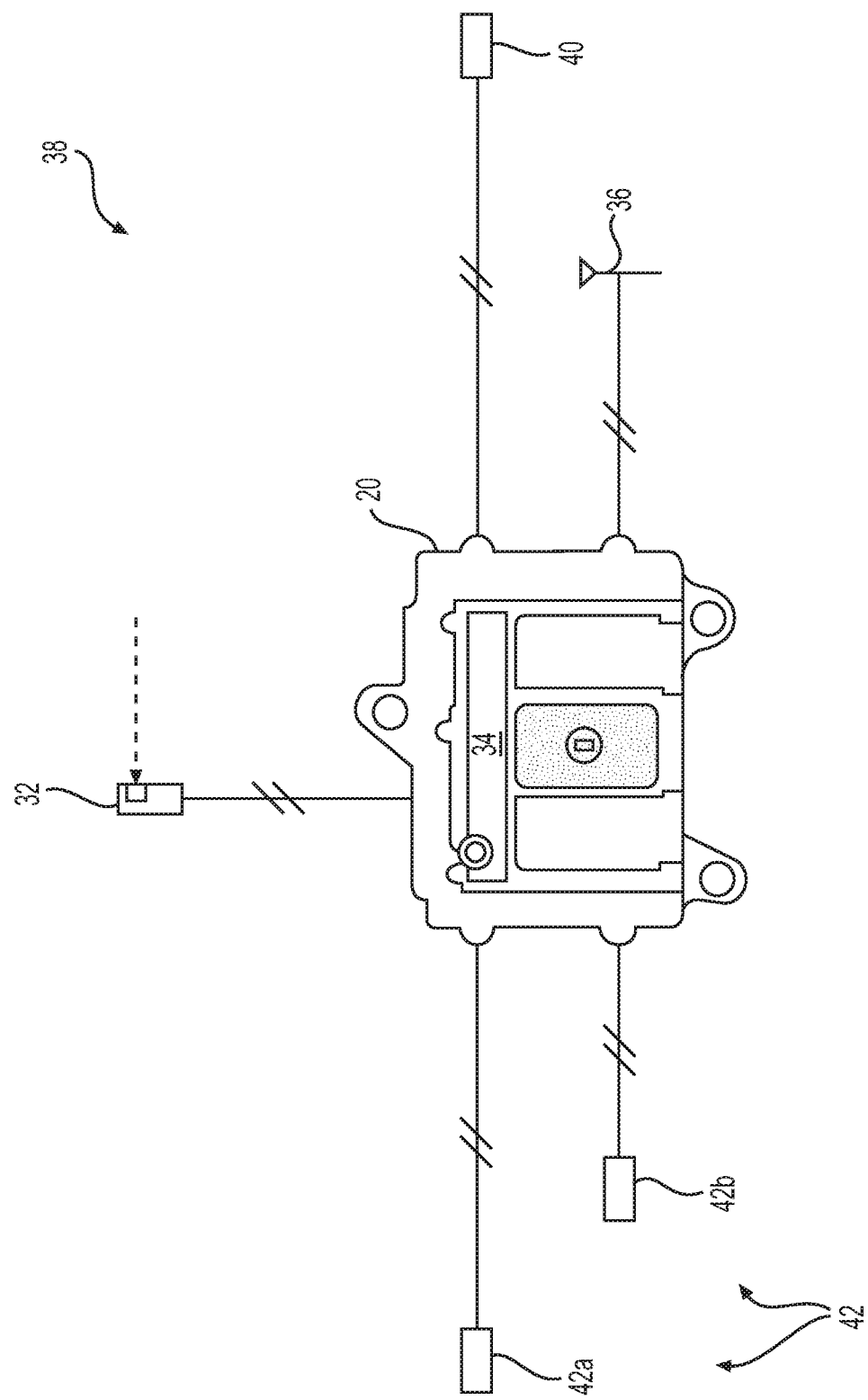
FIG. 6 is a schematic illustration of an exemplary control system that may be used in conjunction with the machine of FIGS. 1-4.

As shown in FIG. 6, the machine 10 may be operated in conjunction with an autonomous control system 38 configured for autonomously controlling the machine 10. As discussed above, the machine may include a frame, a plurality of traction members connected to the frame and configured to support the frame, a powertrain mounted to the frame and configured to drive the plurality of traction members, and a work implement operatively connected to the frame and having an edge configured to engage a material to be moved by the machine. The system may also include at least a first sensor 32 configured to generate a first signal indicative of at least one of one or more operational parameters of the machine 10, and a controller 34 in communication with the at least a first sensor 32, controls for the powertrain of the machine 10, and controls for the work implement. The controller 34 may be configured to implement a method for operating the machine.

The controller 34 may embody a single microprocessor or multiple microprocessors that include a means for monitoring operations of the earthmoving machine 10, communicating with an offboard entity, and detecting properties of the material that is being moved, formed into backstacked piles 12, and smoothed by the machine 10. For example, the controller 34 may include one or more memories, a secondary storage device, a clock, and one or more processors, such as a central processing unit (CPU) or any other means for accomplishing a task consistent with the present disclosure. Numerous commercially available microprocessors can be configured to perform the functions of the controller 34. It should be appreciated that the controller 34 could readily embody a general machine controller capable of controlling numerous other machine functions. Various other known circuits may be associated with the controller 34, including signal-conditioning circuitry, communication circuitry, and other appropriate circuitry.

A communication device 36 mounted on the machine 10 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, the onboard controller 34 may be omitted, and an offboard controller (not shown) may communicate directly with the sensor 32, additional sensors 40, 42, and/or other components of the machine 10 via the communication device 36, if desired.

A travel speed sensor 40 may embody a conventional rotational speed detector having a stationary element rigidly connected to the frame of the machine 10 that is configured to sense a relative rotational movement of a sprocket, axle, or other rotating component associated with the traction devices that engage the ground and move the machine 10 relative to the ground. The stationary element may be a magnetic or optical element mounted to an axle housing (e.g., to an internal surface of the housing) and configured to detect the rotation of an indexing element (e.g., a toothed tone wheel, an imbedded magnet, a calibration stripe, teeth of a timing gear, a cam lobe, etc.) connected to rotate with one or more of the sprocket or other driving member for the traction devices. The indexing element could be connected to, embedded within, or otherwise form a portion of an axle assembly that is driven to rotate by the powertrain of the machine 10. A sensor 40 may be located adjacent the indexing element and configured to generate a signal each time the indexing element (or a portion thereof, for example a tooth) passes near the stationary element. This signal may be directed to the controller 34, and the controller 34 may use this signal to determine a distance travelled by the machine 10 between signal generation times (i.e., to determine a travel speed of the machine 10). The controller 34 may record the traveled distances and/or speed values associated with the signal within an array during forward travel of the machine 10 toward each pile of material 12, or while reversing away from a pile of material. Alternatively or additionally, the controller 34 may simply record a number of rotations of a drive sprocket that have occurred within fixed time intervals, and then later use this information along with known kinematics of the machine to determine the distance and speed values. The controller 34 may also be configured to measure and calibrate the variations in various values derived from signals indicative of various operational parameters over different periods of time. Other types of sensors and/or strategies may also or alternatively be employed.

Exemplary load sensors 42 may be provided on the machine 10, and may each be any type of sensor known in the art that is capable of generating a load signal indicative of a loading status of the work implement. The loading status of the work implement may be associated with an amount of material inside of or being carried by the work implement. Alternatively or in addition, the loading status of the work implement may be associated with an amount of force passing through the work implement, such as when the work implement is being pushed into or against the pile of material 12. For example, the load sensor 42 may be a torque sensor 42a associated with a torque converter of the powertrain, or an accelerometer 42b. When the load sensor 42 is embodied as a torque sensor 42a, the load signal may correspond with a change in torque output experienced by the powertrain during travel of the machine 10. In one embodiment, the torque sensor may be physically associated with the transmission or final drive of the powertrain. In another embodiment, the torque sensor may be physically associated with the engine of the powertrain. In yet another embodiment, the torque sensor may be a virtual sensor used to calculate the torque output of the powertrain based on one or more other sensed parameters (e.g., fueling of the engine, speed of the engine, and/or the drive ratio of the transmission or final drive). The accelerometer 42b may embody a conventional acceleration detector rigidly connected to the frame of the machine 10 in an orientation that allows sensing of fore/aft changes in acceleration of the machine 10. The autonomous control system 38 may include any number and combination of load sensors 42. Additional sensors located on the machine 10 may provide signals indicative of the amount by which the work implement has been racked back, pitched forward, lifted, or otherwise moved from an initial starting or neutral position. Sensors may also produce signals indicative of the overall pitch of the machine 10, machine steering commands, the heading of the machine 10, the heading of a slot that the machine 10 is currently operating in, the slope of the terrain the machine 10 is operating on, and other machine operational parameters and environmental characteristics at the worksite.

The controller 34 of the autonomous control system 38 associated with the machine 10 may be configured to operate the machine in order to autonomously backstack and smooth piles of dirt during an operation at a worksite to remove overburden material from an area being mined. The controller 34 may be configured to receive a plurality of signals indicative of one or more parameters including a ground speed of the machine, a target ground speed of the machine, a load on the work implement of the machine, an output speed of a torque converter of the machine, a machine pitch, a machine steering command, a machine heading, and a heading of a slot the machine is in. The controller may be further configured to standardize and normalize each signal from the plurality of signals in order to create values for each of the one or more parameters that all fall within a common range, independent from the units of the parameters. The common range may be representative of a range from minimum to maximum values for each of the one or more parameters. As an example, blade loads experienced during the operation may range from approximately 0 to 950 kilonewtons, while torque converter output speeds may range from approximately 0 to 2100 rpm. Accordingly, a common range of −1000 to +1000 may be established, wherein the minimum value for each parameter (e.g., 0 for both the blade load and for the torque converter output speed) corresponds to the lower threshold of −1000, and the maximum value for each parameter (e.g., 950 kilonewtons for the blade load and 2100 rpm for the torque converter output speed) corresponds to the upper threshold of +1000.

The controller may be further configured to determine a variation of each of the values for the one or more parameters over each of a plurality of time periods. Exemplary time periods over which the parameters may be evaluated by the controller may include 0.5 second, 1 second, 2 seconds, and 4 seconds. The time periods over which the controller may determine variations of each of the parameters may include additional or alternative lengths of time to those mentioned above. The inclusion of a variety of time periods over which the controller may determine variations of the parameters may provide a more robust solution for evaluating the relative effects of each of a variety of operational and environmental factors in determining whether the machine has pushed a pile of dirt into contact with another pile of dirt. By determining the variations of each of the values for the one or more parameters over each of the plurality of time periods, the controller may calculate relative rates of change for the parameters. In various implementations of this disclosure, the controller may also be configured to perform low pass filtering of the standardized and normalized values for each of the operational parameters with a K factor that may be dependent on the selected time periods over which variations are determined. The controller may be still further configured to weight each of the values for each of the one or more parameters as a function of how quickly each value is changing over each of the plurality of time periods. The controller may also be configured to add up the weighted values of the parameters, and apply a sigmoid normalization function to the weighted values of the parameters in order to limit the effect any one of the values of the parameters has on an output indicative of a likelihood that the machine has pushed a pile of dirt into another pile of dirt.

The autonomous control system 38 may include the controller 34 being further configured to weight the weighted values of each of the one or more operational parameters in relationship to each of the other weighted values of other parameters based on which of the parameters has the greatest effect on a determination that the machine has pushed a pile of dirt into another pile of dirt. A sigmoid normalization function may also be performed on the weighted values to once again reduce the influence of extreme values or outliers in the values for the operational parameters. The controller may be configured to compare the final weighted and sigmoid normalized values for the various parameters to a threshold to determine whether a pile has been detected. The controller 34 may be associated with one or more memories that may store historical and/or empirical data gathered by various sensors mounted on a machine or sensors positioned to monitor the environment surrounding an area at a work site being operated on by the machine. The stored data may represent sensory output indicative of behavior characteristic of the operation of the machine when the machine has pushed a pile of dirt into contact with another pile of dirt. The controller may be further configured to transition the work implement of the machine from a carry configuration to a spread configuration. In some implementations of this disclosure, the work implement may be maintained in a spread configuration during the entire time the pile detection algorithm is being performed. This may help to ensure that the work implement does not carry any material back when the machine is reversed after having pushed a pile of dirt the desired amount into another pile of dirt. The controller may be configured to transition the work implement to a carry configuration by racking the work implement backwards in order to retain more material in the work implement, and transition the work implement to a spread configuration by pitching the work implement forward while lifting the work implement in order to shed more material from the work implement and allow the material to pass underneath the implement.

The controller may be further configured to determine a configurable reverse time that is allowed to elapse between detection that the machine has pushed a pile of dirt into contact with another pile of dirt and when the machine is actually reversed in a direction away from the pile of dirt. A longer configurable reverse time corresponds to the machine compacting the material from the pile of dirt being pushed by the machine into another pile of dirt by a greater amount than when a shorter configurable reverse time is allowed to elapse. A longer configurable reverse time may correspond to a smaller blade load being carried by the machine and a shorter configurable reverse time may correspond to a larger blade load being carried by the machine. The longer configurable reverse time associated with a smaller blade load may allow more time for the machine to push a pile of dirt into a pile of dirt in front of the pushed pile in order to reach a desired threshold point.

The autonomous control system may be configured such that the common range for the normalized data acquired from each of the sensors providing signals indicative of operational and environmental parameters is set, for example, from −1000 to +1000. The controller of the control system may be configured to perform a sigmoid normalization on all of the parameters being acquired by the various sensors in order to reduce the influence of extreme values or outliers in the data without actually removing the extreme values from the dataset. This feature of the controller allows for retention of the outlier data while still preserving the significance of data within a standard deviation of the mean. A hyperbolic tangent function performed on the values for each parameter measured by the sensors may limit the ranges of the normalized data to values between −1000 and +1000, between −100 and +100, or between −1 and +1. An upper threshold of the range of values may correspond to values for the operational parameters characteristic of the machine having pushed a pile of dirt by a desired amount into another pile of dirt. A lower threshold of the range of values may correspond to values for the operational parameters characteristic of the machine shedding material from a blade of the machine. In order to avoid introducing errors or obtaining false positives regarding detection of a pile, the method steps implemented by the controller may be commenced only when the machine is within a predetermined distance from a last deposited pile of dirt.

Figure 7:
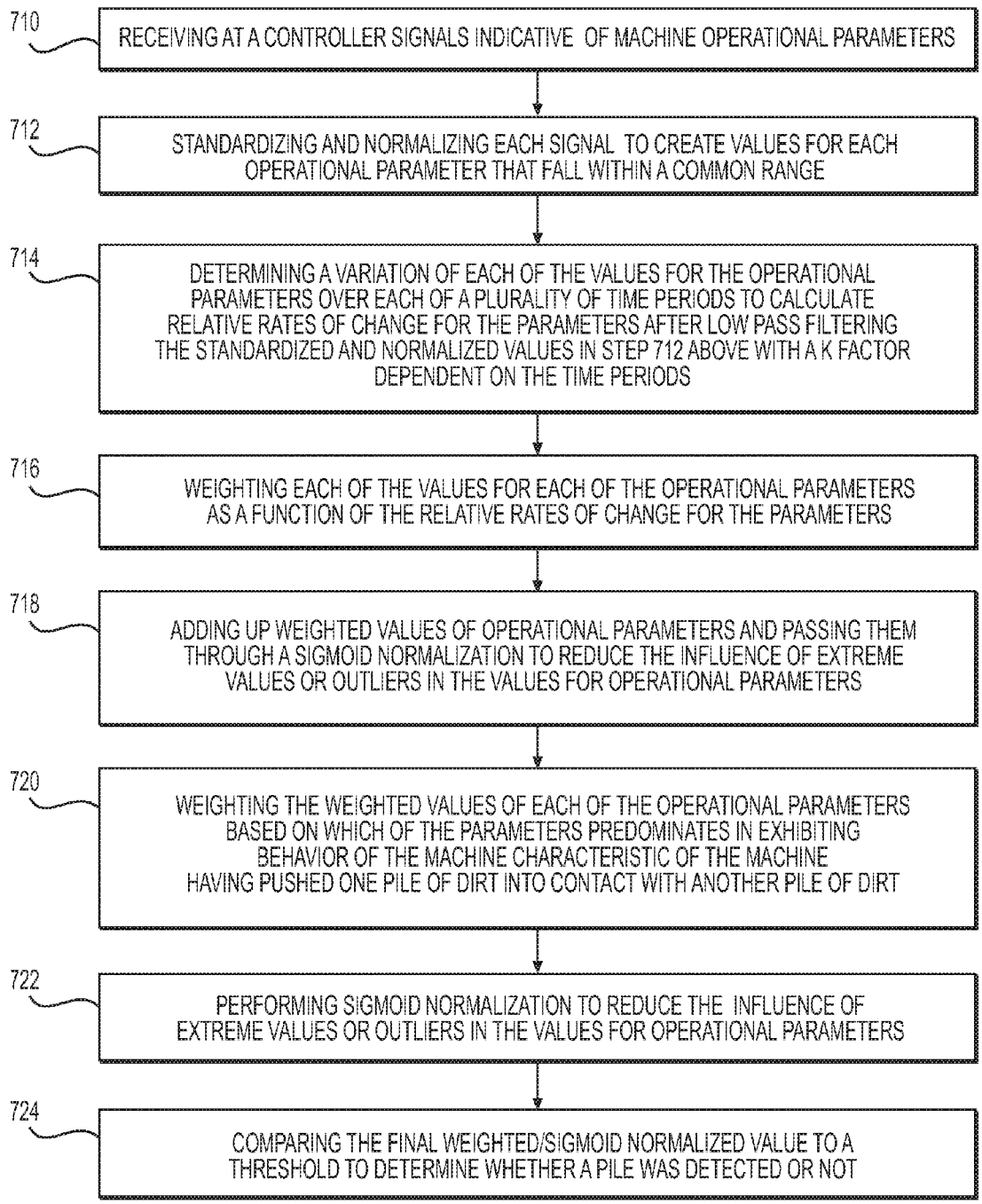
FIG. 7 is a flowchart depicting an exemplary disclosed method that may be performed by the control system of FIG. 6 and earthmoving machine of FIGS. 1-4.

FIG. 7 illustrates an exemplary method that may be performed by the autonomous control system 38. FIG. 7 will be discussed in more detail in the following section to further illustrate the disclosed concepts.

INDUSTRIAL APPLICABILITY

The disclosed autonomous control system finds potential application in association with an earthmoving machine at any worksite where it is desirable to form layers of material by backstacking piles of the material and then smoothing over the backstacked piles before forming additional layers on top of each previously formed layer. The system may be configured to provide tool loading assistance, optimized pile spacing, efficient and safe shaping and smoothing of the piles, and automated control of the entire process. The system finds particular application with a bulldozer that operates under hazardous conditions or in a remote environment where it is desirable to provide autonomous control of the machine. The system may assist control of the machine by automatically detecting tool engagement with a pile of material, and responsively determining an optimized spacing and compaction of each of successive backstacked piles formed autonomously by the machine. Operation of the autonomous control system 38 will now be described in detail with reference to FIG. 7.

A method performed by the autonomous control system 38 may detect when an earthmoving machine has moved a pile of dirt into contact with another pile of dirt. Step 710 of the method may include receiving at a controller associated with the machine a plurality of signals indicative of one or more machine operational parameters, including a ground speed of the machine, a target ground speed of the machine, a load on a work implement of the machine, an output speed of a torque converter of the machine, a machine pitch, a machine steering command, a machine heading, and a heading of a slot the machine is in. Each of the signals indicative of the various operational parameters may have different units of measurement and significantly different ranges of values.

In order to be able to provide a valid comparison of the effects of each of the different signals received from various sensors and other devices monitoring machine operational parameters and other environmental parameters, Step 712 may include standardizing and normalizing each signal from the plurality of signals using the controller in order to create values for each of the one or more parameters that all fall within a common range. The common range may be selected to be representative of a range from minimum to maximum values for each of the one or more parameters. For example, one set of signals received from one or more sensors may be indicative of bulldozer blade loads, and may have values that range from a minimum of 0 kilonewtons up to a maximum of 950 kilonewtons. Another set of signals received from other sensors may be indicative of torque converter output speed, and may have values that range from a minimum of 0 revolutions per minute (rpm) to a maximum of 2100 rpm. Therefore, in order to be able to provide a valid comparison of the effects each of the parameters may have in exhibiting behavior of the machine characteristic of the machine having pushed one pile of dirt into contact with another pile of dirt, the values of the parameters may be standardized and normalized to fall within a single common range. In this way the controller may determine, for example, that the current blade load is at approximately 90% of a maximum blade load for the particular machine when the machine has pushed a pile of dirt into contact with another pile of dirt, while the torque converter output speed is at approximately 60% of a maximum torque converter output speed for the machine.

At Step 714, the controller may determine a variation of each of the values for the one or more parameters over each of a plurality of time periods to calculate relative rates of change for the one or more parameters at any particular point in time. The controller may also perform low pass filtering of the standardized and normalized values for the operational parameters with a K factor that may be dependent on the selected time periods. In some exemplary implementations of this disclosure, the change of each of the values for the parameters may be measured over time intervals that may include 0.5 second, 1 second, 2 seconds, and 4 seconds. Alternative or additional time periods may also be used during the determination of changes in each of the values for the parameters. The controller may filter the signals received from each of the various sensors and other devices in order to smooth out the signals and eliminate values that fall too far outside of expected or normal ranges for each of the parameters.

After determining the relative rates of change for each of the parameters over the predetermined time periods, at Step 716 the controller may weight each of the values for each of the one or more parameters as a function of the relative rates of change for the one or more parameters over each of the time periods. By considering rates of change of parameters over different lengths of time, the controller may be able to perform a valid comparison of different parameters that may exhibit changes over different lengths of time. As one example, the controller may determine that the standardized and normalized value for machine ground speed changes the most over the last 0.5 second time period when the machine is pushing a pile of dirt into contact with another pile of dirt. The controller may then provide the greatest weight to that particular 0.5 second time period for values of machine ground speed. The controller may also determine that the standardized and normalized value for torque converter output speed changes the most (has the largest rate of change) over a different time period. The controller may then provide the greatest weight to the particular time period during which torque converter output speed has the largest rate of change. As a result, the controller is able to determine which time periods predominate in exhibiting behavior of the machine characteristic of the machine having pushed one pile of dirt into contact with another pile of dirt for each of the individual operational parameters.

After weighting each of the standardized and normalized values for the various operational parameters, at Step 718 the controller may then add up the weighted values of the various operational parameters and pass the weighted values through a sigmoid normalization function to reduce the influence of extreme values or outliers in the values for the parameters. At Step 720 the weighted values of each of the operational parameters may be further weighted relative to each other based on which of the parameters predominates in exhibiting behavior of the machine characteristic of the machine having pushed one pile of dirt into contact with another pile of dirt. At Step 722, the controller may again perform a sigmoid normalization function on the weighted values of the parameters in order to smooth the results and limit the effect any one of the parameters may have on an output indicative of behavior characteristic of the machine having pushed a pile of dirt into contact with another pile of dirt. Finally, at Step 724, the final weighted and sigmoid normalized values for the operational parameters may be compared to a threshold to determine whether a pile has been detected or not.

The autonomous method performed in accordance with various implementations of this disclosure may further include transitioning a work implement of the machine from a carry configuration to a spread configuration. Transitioning the work implement to a carry configuration may include racking the work implement backwards in order to retain more material in the work implement, and transitioning the work implement to a spread configuration may include pitching the work implement forward in order to shed more material from the work implement. The transitioning from carry configuration to spread configuration may occur before the above-described method steps for detecting a pile are performed. The spread configuration may be employed in order to avoid carrying any material in the work implement when the machine is backed away from a pile of dirt. The autonomous method may further include determining a configurable reverse time that is allowed to elapse between detection that the machine has pushed a pile of dirt into contact with another pile of dirt and when the machine is reversed. A longer configurable reverse time may correspond to the machine compacting the material from the pile of dirt being pushed by the machine into another pile of dirt by a greater amount than when a shorter configurable reverse time is allowed to elapse. A longer configurable reverse time may also correspond to a smaller material load being carried by the machine, while a shorter configurable reverse time may correspond to a larger material load being carried by the machine.

In various exemplary implementations of this disclosure the common range for the various values of operational parameters received by the controller may be set by the controller to a range from approximately −1000 to +1000. Alternative implementations may set the common range between different values, such as between −100 to +100, between −1 and +1, etc. An upper threshold of the common range for the values of operational parameters may correspond to values for the operational parameters of the machine characteristic of the machine having pushing a pile of dirt into another pile of dirt by a desired amount. A lower threshold of the common range for the values of operational parameters may correspond to values for the operational parameters of the machine characteristic of the machine shedding material from a work implement of the machine at a point when smoothing of the piles of dirt is being performed and/or when the machine is being backed away from the piles of dirt. In order to avoid receiving false indications of when the machine has pushed a pile of dirt into contact with another pile of dirt, the autonomous method steps in accordance with various implementations of this disclosure may only commence when the machine is within a predetermined distance from a last pile of dirt.

It will be apparent to those skilled in the art that various modifications and variations can be made to the autonomous control system of the present disclosure. Other embodiments will be apparent to those skilled in the art from consideration of the specification and practice of the excavation system disclosed herein. It is intended that the specification and examples be considered as exemplary only, with a true scope being indicated by the following claims and their equivalents.

What is claimed is:

1. An autonomous method for detecting when an earth-moving machine has moved a pile of dirt into contact with another pile of dirt, the method comprising:
   receiving at a controller a plurality of signals indicative of one or more parameters including a ground speed of the machine, a target ground speed of the machine, a load on a work implement of the machine, an output speed of a torque converter of the machine, a machine pitch, a machine steering command, a machine heading, and a heading of a slot the machine is in;
   standardizing and normalizing each signal from the plurality of signals using the controller in order to create values for each of the one or more parameters that all fall within a common range, wherein the common range is representative of a range from minimum to maximum values for each of the one or more parameters;
   determining, using the controller, a variation of each of the values for the one or more parameters over each of a plurality of time periods to calculate relative rates of change for the one or more parameters;
   weighting each of the values for each of the one or more parameters as a function of the relative rates of change for the one or more parameters;
   adding up the weighted values of the parameters;
   applying a sigmoid function to the weighted values of the parameters using the controller in order to limit the effect any one of the parameters has on an output indicative of behavior characteristic of the machine having pushed a pile of dirt into contact with another pile of dirt; and
   transitioning a work implement of the machine from a carry configuration to a spread configuration.

2. The autonomous method of claim 1, further including weighting the weighted values of each of the one or more parameters in relationship to each of the other weighted values of other parameters based on which of the parameters predominates in exhibiting behavior of the machine characteristic of the machine having pushed a pile of dirt into contact with another pile of dirt.

3. The autonomous method of claim 1, wherein transitioning the work implement to a carry configuration includes racking the work implement backwards in order to retain more material in the work implement, and transitioning the work implement to a spread configuration includes pitching the work implement forward in order to shed more material from the work implement.

4. The autonomous method of claim 1, further including determining a configurable reverse time that is allowed to elapse between detection that the machine has pushed a pile of dirt into contact with another pile of dirt and when the machine is reversed.

5. The autonomous method of claim 4, wherein a longer configurable reverse time corresponds to the machine compacting the material from the pile of dirt being pushed by the machine into another pile of dirt by a greater amount than when a shorter configurable reverse time is allowed to elapse.

6. The autonomous method of claim 5, wherein a longer configurable reverse time corresponds to a smaller material load being carried by the machine and a shorter configurable reverse time corresponds to a larger material load being carried by the machine.

7. The autonomous method of claim 1, wherein the common range is set from approximately −1000 to +1000, and wherein an upper threshold of the range corresponds to the machine pushing a pile of dirt into another pile of dirt, and a lower threshold of the range corresponds to the machine shedding material from a work implement of the machine.

8. The autonomous method of claim 1, wherein the method steps only commence when the machine is within a predetermined distance from a last pile of dirt.

9. A system for autonomously controlling an earthmoving machine, wherein the earthmoving machine includes:
a frame;
a plurality of driving members connected to the frame and configured to support the frame;
a powertrain mounted to the frame and configured to drive the plurality of driving members;
a work implement operatively connected to the frame and having a surface configured to engage a material to be moved by the machine; and
at least a first sensor configured to generate a first signal indicative of at least one of a plurality of operational parameters of the machine; the system further including
a controller in communication with the at least a first sensor, controls for the powertrain, and controls for the work implement, the controller being configured to implement a method for operating the machine comprising:
receiving a plurality of signals indicative of one or more parameters including a ground speed of the machine, a target ground speed of the machine, a load on the work implement of the machine, an output speed of a torque converter of the machine, a machine pitch, a machine steering command, a machine heading, and a heading of a slot the machine is in;
standardizing and normalizing each signal from the plurality of signals in order to create values for each of the one or more parameters that all fall within a common range, wherein the common range is representative of a range from minimum to maximum values for each of the one or more parameters;
determining a variation of each of the values for the one or more parameters over each of a plurality of time periods to calculate relative rates of change for the one or more parameters;
weighting each of the values for each of the one or more parameters as a function of the relative rates of change for the one or more parameters;
adding up the weighted values of the parameters; and
applying a sigmoid function to the weighted values of the parameters in order to limit the effect any one of the parameters has on an output indicative of behavior characteristic of the machine having pushed a pile of dirt into contact with another pile of dirt.

10. The system of claim 9, wherein the controller is further configured to weight the weighted values of each of the one or more parameters in relationship to each of the other weighted values of other parameters based on which of the parameters has the greatest effect on a determination that the machine has pushed a pile of dirt into another pile of dirt.

11. The system of claim 9, wherein the controller is further configured to transition the work implement of the machine from a carry configuration to a spread configuration.

12. The system of claim 11, wherein the controller is configured to transition the work implement to a carry configuration by racking the work implement backwards in order to retain more material in the work implement, and transition the work implement to a spread configuration by pitching the work implement forward in order to shed more material from the work implement.

13. The system of claim 9, wherein the controller is further configured to determine a configurable reverse time that is allowed to elapse between detection that the machine has pushed a pile of dirt into contact with another pile of dirt and when the machine is reversed in a direction away from the pile of dirt.

14. The system of claim 13, wherein a longer configurable reverse time corresponds to the machine compacting the material from the pile of dirt being pushed by the machine into another pile of dirt by a greater amount than when a shorter configurable reverse time is allowed to elapse.

15. The system of claim 14, wherein a longer configurable reverse time corresponds to a smaller blade load being carried by the machine and a shorter configurable reverse time corresponds to a larger blade load being carried by the machine.

16. The system of claim 9, wherein the common range is set from −1000 to +1000, and wherein one threshold of the range corresponds to the machine pushing a pile of dirt into another pile of dirt, and an opposite threshold of the range corresponds to the machine shedding material from a blade of the machine.

17. The system of claim 9, wherein the method steps implemented by the controller only commence when the machine is within a predetermined distance from a last pile of dirt.

18. A non-transitory computer-readable media comprising computer-executable instructions that, when executed on one or more processors, perform a method for detecting when an earthmoving machine has moved a pile of dirt into contact with another pile of dirt, the method comprising:
receiving a plurality of signals indicative of one or more parameters including a ground speed of the machine, a target ground speed of the machine, a load on a work implement of the machine, an output speed of a torque converter of the machine, a machine pitch, a machine steering command, a machine heading, and a heading of a slot the machine is in;
standardizing and normalizing each signal from the plurality of signals in order to create values for each of the one or more parameters that all fall within a common range, wherein the common range is representative of a range from minimum to maximum values for each of the one or more parameters; determining a variation of each of the values for the one or more parameters over each of a plurality of time periods;
weighting each of the values for each of the one or more parameters as a function of how quickly each value is changing over each of the plurality of time periods;
adding up the weighted values of the parameters;
applying a sigmoid function to the weighted values of the parameters in order to limit the effect any one of the values of the parameters has on an output indicative of a determination that the machine has pushed a pile of dirt into another pile of dirt; and
transitioning a work implement of the machine from a carry configuration to a spread configuration.

19. The non-transitory computer-readable media of claim 18, wherein the method further includes weighting the weighted values of each of the one or more parameters in relationship to each of the other weighted values of other parameters based on which of the parameters has the greatest effect on a determination that the machine has pushed a pile of dirt into another pile of dirt.

\* \* \* \* \*